(12) United States Patent
Beeson et al.

(10) Patent No.: US 10,271,101 B2
(45) Date of Patent: *Apr. 23, 2019

(54) METHOD AND SYSTEM FOR PERFORMING A FUNCTION AT A USER DEVICE BY COMBINING CATEGORY DISPLAY AREAS

(71) Applicant: The DIRECTV Group, Inc., El Segundo, CA (US)

(72) Inventors: Charles W. Beeson, La Mirada, CA (US); Jason L. Howk, Highlands Ranch, CO (US); Yoonjung Kim, Los Angeles, CA (US); Laura Ginhee Wirsta, Van Nuys, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/982,286

(22) Filed: May 17, 2018

(65) Prior Publication Data

US 2018/0270533 A1 Sep. 20, 2018

Related U.S. Application Data

(63) Continuation of application No. 15/085,919, filed on Mar. 30, 2016, now Pat. No. 10,015,545.
(Continued)

(51) Int. Cl.
*H04N 5/445* (2011.01)
*H04N 21/454* (2011.01)
(Continued)

(52) U.S. Cl.
CPC ....... *H04N 21/454* (2013.01); *G06F 3/04842* (2013.01); *G06F 3/04845* (2013.01);
(Continued)

(58) Field of Classification Search
CPC .... H04N 21/4622; G06F 9/444; G06F 3/0481
See application file for complete search history.

(56) References Cited

U.S. PATENT DOCUMENTS

| 6,003,034 A | 12/1999 | Tuli |
| 2006/0095937 A1 | 5/2006 | Knudson et al. |

(Continued)

*Primary Examiner* — Gigi L Dubasky
(74) *Attorney, Agent, or Firm* — Harness, Dickey & Pierce, P.L.C.

(57) ABSTRACT

A user device and method comprises a screen display and a user interface. A display control module defines a first display area with a first boundary therearound and displaying a first category indicator for a first category therein. The display control module defines a second display area with a second boundary and displays a second category indicator for a second category therein. A gesture control module receives a movement signal from the user interface for moving the first display area relative to the second display area using a user interface. The display control module defines a third boundary around a third display area representing the first category and the second category when the first boundary and the second boundary touch or overlap and displays the first category indicator and the second category indicator within the third boundary. When the third display area is selected, a function may be performed.

18 Claims, 14 Drawing Sheets

Related U.S. Application Data

(60) Provisional application No. 62/163,635, filed on May 19, 2015.

(51) Int. Cl.

| | | |
|---|---|---|
| *G06F 3/0484* | (2013.01) | |
| *G06F 3/0488* | (2013.01) | |
| *H04N 21/472* | (2011.01) | |
| *H04N 21/482* | (2011.01) | |
| *H04N 21/431* | (2011.01) | |
| *H04N 21/45* | (2011.01) | |
| *H04N 21/475* | (2011.01) | |
| *H04N 21/61* | (2011.01) | |
| *H04N 21/422* | (2011.01) | |

(52) U.S. Cl.
CPC ..... *G06F 3/04883* (2013.01); *H04N 21/4312* (2013.01); *H04N 21/47202* (2013.01); *H04N 21/4826* (2013.01); *G06F 2203/04803* (2013.01); *H04N 21/42224* (2013.01); *H04N 21/4532* (2013.01); *H04N 21/4751* (2013.01); *H04N 21/6143* (2013.01)

(56) References Cited

U.S. PATENT DOCUMENTS

| | | |
|---|---|---|
| 2009/0307629 A1 | 12/2009 | Horiuchi et al. |
| 2011/0040657 A1 | 2/2011 | Roswell |
| 2012/0194336 A1* | 8/2012 | Thiruvengada .. G08B 13/19645 340/525 |
| 2012/0206391 A1* | 8/2012 | Kim ................... H04M 1/7253 345/173 |
| 2013/0069969 A1* | 3/2013 | Chang ............... H04M 1/72552 345/589 |
| 2015/0082335 A1 | 3/2015 | Cobb |

\* cited by examiner

METHOD AND SYSTEM FOR PERFORMING A FUNCTION AT A USER DEVICE BY COMBINING CATEGORY DISPLAY AREAS

CROSS-REFERENCE TO RELATED APPLICATIONS

This application is a continuation of U.S. patent application Ser. No. 15/085,919 filed on Mar. 30, 2016. This application claims the benefit of U.S. Provisional Application No. 62/163,635, filed on May 19, 2015. The entire disclosures of each of the above applications are incorporated herein by reference.

TECHNICAL FIELD

The present disclosure relates generally a television programming delivery system, and, more specifically, to using a user device to conveniently search for and playback content.

BACKGROUND

The statements in this section merely provide background information related to the present disclosure and may not constitute prior art.

Television content providers are continually increasing the amount of television content provided. In addition to the actual television programming content, television providers also provide limited information regarding the content such as a brief description, running time, parental ratings, and the like. The limited data may be metadata delivered with the content or guide data and may be delivered directly to the set top box. Content users increasingly desire further information relative to the content to help them cull through the numerous content offerings. Determining content by entering search terms may be inconvenient especially for children who would like to view content. Spelling and other issues may inhibit children from fining the proper results.

Mobile devices such as touch screen mobile devices have also increased in popularity. Such devices are typically connectable to the internet to obtain content from various sources. Mobile touch screen devices include the iPad® by Apple and various Android® operating system devices. The mobile devices are capable of receiving Internet Protocol content including streamed videos.

SUMMARY

The present disclosure provides a system and method for using a user device for providing a convenient system and method for searching content.

In one aspect of the disclosure, a method includes defining a first display area on a screen display of a user device with a first boundary therearound, displaying a first category indicator for a first category within the first boundary in screen display, defining a second display area on the screen display with a second boundary therearound, displaying a second category indicator for a second category within the second boundary on the screen display, generating a movement signal for moving the first display area relative to the second display area using a user interface, when the first boundary and the second boundary touch or overlap on the screen display, defining a third boundary around a third display area representing the first category and the second category, displaying the first category indicator and the second category indicator within the third boundary, selecting the third display area using the user interface and performing a function in response to selecting.

In a further aspect of the disclosure, a user device includes a screen display, a user interface and a display control module defining a first display area on the screen display of with a first boundary therearound and displaying a first category indicator for a first category within the first boundary in screen display. The display control module defines a second display area on the screen display with a second boundary therearound and displays a second category indicator for a second category within the second boundary on the screen display. A gesture control module receives a movement signal from the user interface for moving the first display area relative to the second display area using a user interface. The display control module defines a third boundary around a third display area representing the first category and the second category when the first boundary and the second boundary touch or overlap on the screen display and displaying the first category indicator and the second category indicator within the third boundary. The gesture module recognizes a selection signal from the user interface that selected the third display area. A controller performs a function in response to the selection signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
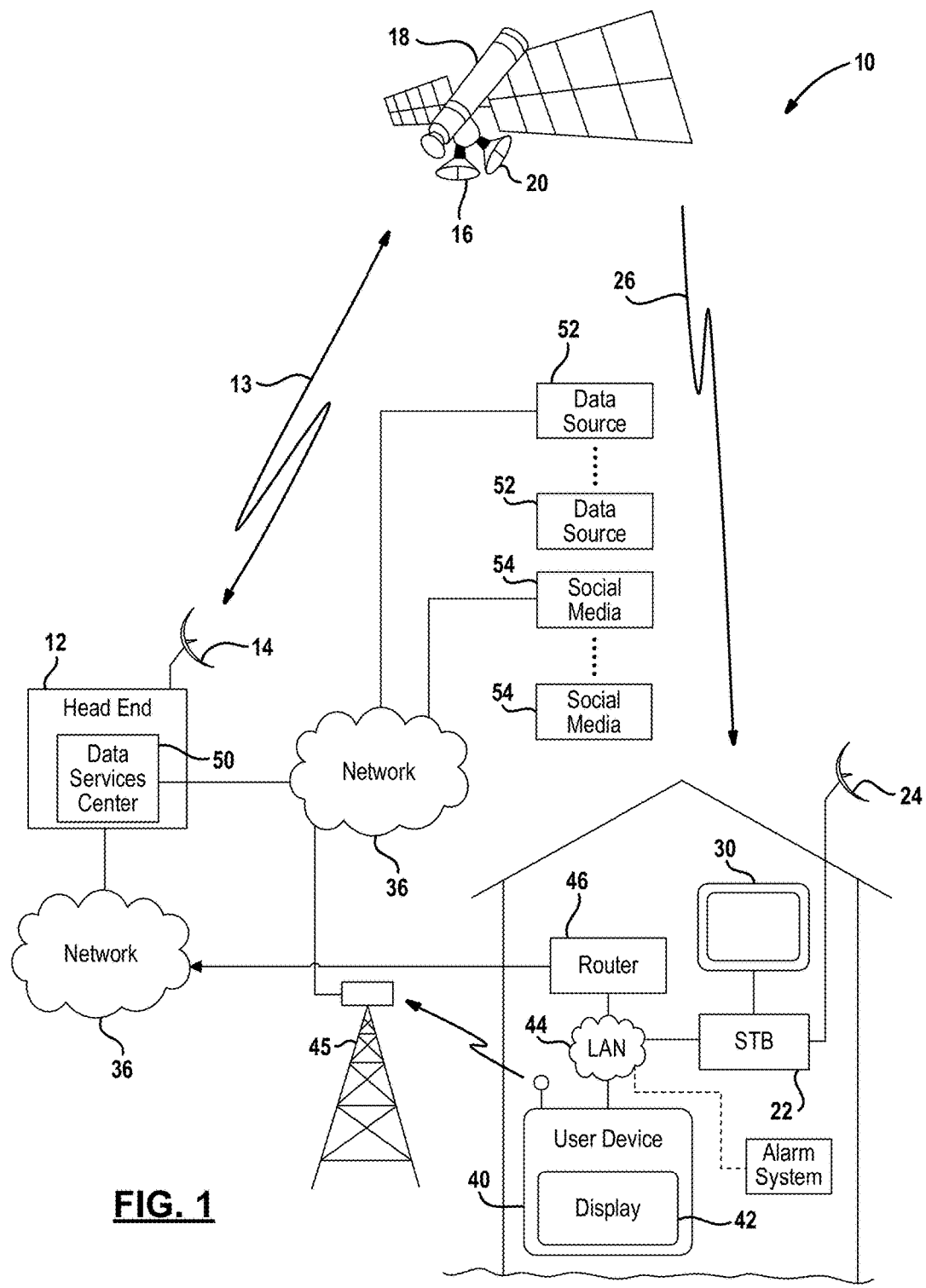
FIG. 1 is a block diagrammatic view of a communication system for content playback and delivery according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a nonexclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multichannel Multipoint Distribution System (MMDS), Local Multipoint Distribution System (LMDS), etc.), Internet-based distribution systems, cellular distribution systems, power line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to programs, data, information, movies, assets, video data, etc., however, it will be readily apparent to persons of ordinary skill in the art that these terms are substantially equivalent in reference to the example systems and/or methods disclosed herein. As used herein, the term content, title or program will be used to refer to a movie or television program name.

The system may also be used for controlling functions of various systems. As will be further described below, the controlling of alarm system functions may also be performed using the present disclosure. Setting up various profiles may also be performed by the present disclosure. For example, setting profiles based on age restrictions for television and movie content may also be performed.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. A set top box 22 is an example of a stationary receiving device or system that may be placed at different locations relative to the display or television. The set top box 22 is in communication with an antenna 24. The antenna 24 receives downlink signals 26 from the transmitting antenna 20 of the satellite 18.

The head end 12 may communicate various content, program guide data or other data through the satellite 18. For example, television channels from a broadcast network or channels generated locally at the head end 12 may be communicated through the satellite. The set top box 22 may receive the content and data. A plurality of set top boxes 22 may be provided in a system. The plurality of set top boxes 22 may be located within a single building or household.

The set top box or boxes 22 each have a display 30 associated therewith. The display 30 may be a television or monitor used for displaying video images and providing an audio output.

A network 36 may be used to connect the head end 12 with various devices including the set top box 22. The network 36 may be one type of network or multiple types of networks. The network 36 may, for example, be a public switch to telephone network, the internet, a mobile telephone network or other type of network. The head end 12 may simultaneously communicate streaming channel signals corresponding to all or a limited set of the channels from the head end 12. The streaming channels are communicated through the head end 12.

The system 10 may also include a user device 40. The user device 40 may be various types of devices including a mobile phone, a laptop, or a touch screen device, tablet device or computer. The user device 40 may have a screen display 42 used for displaying various types of information as will be set forth further below. The user device 40 may be referred to as a mobile device. The screen display 42 may be a touch screen display.

A local area network (LAN) 44 may also be incorporated into the system. The local area network 44 may be in communication with the set top box 22 and the user device 40. The local area network 44 may be a wireless local area network.

The local area network 44 may also include a router 46. The router 46 may allow the devices within the local area network 44 to intercommunicate. In this example, the local area network 44 may allow the user device 40 and the set top box 22 to communicate. The router 46 may also communicate with the network 36. The local area network 44 may be used to communicate the streaming channels to the user device 40.

The user device 40 may also be in communication directly with a cell tower 45 that communicates signals from the user device 40 to the network 36. The user device 40 may thus bypass the router 46 when communicating with the network 36.

A data services center module 50 (data services center) may be in communication with the head end 12. The data services center 50 may also be included in the head end 12 as is illustrated. The data services center 50 is in communication with the network 36 to gather various data. As mentioned above, the network 36 may be the internet. The data services center 50 may gather data from various data sources 52 and act as a data server for distributing the data. The data sources 52 may include data sources 52 for different types of data related to the content provided. Examples of data will be provided below. In general, the data may include actor information, pictures, posters, ratings data, sports scores, and the like. The data services module may have categories for the various types of content available. For example, animation, comedy, fantasy, adventure, science fiction and laughs may all be categories. These categories may be categories that are limited by age and by content source or both. The may also be combinations of different content genres or sub genres as well. For example, animation may only be limited to a handful of broadcaster content such as Disney® or Nickelodeon®.

Another source of data in communication with the data services center 50 is a social media source 54. Various types of social media sources may be used including websites. Blogs, Twitter®, and Facebook® are examples of social media sources or websites. The data services center 50, as will be described below, may aggregate data from the various sources. The data may be aggregated and indexed in a database with the head end 12 or data services center 50 to correspond to a content identifier as will be described below.

Figure 2:
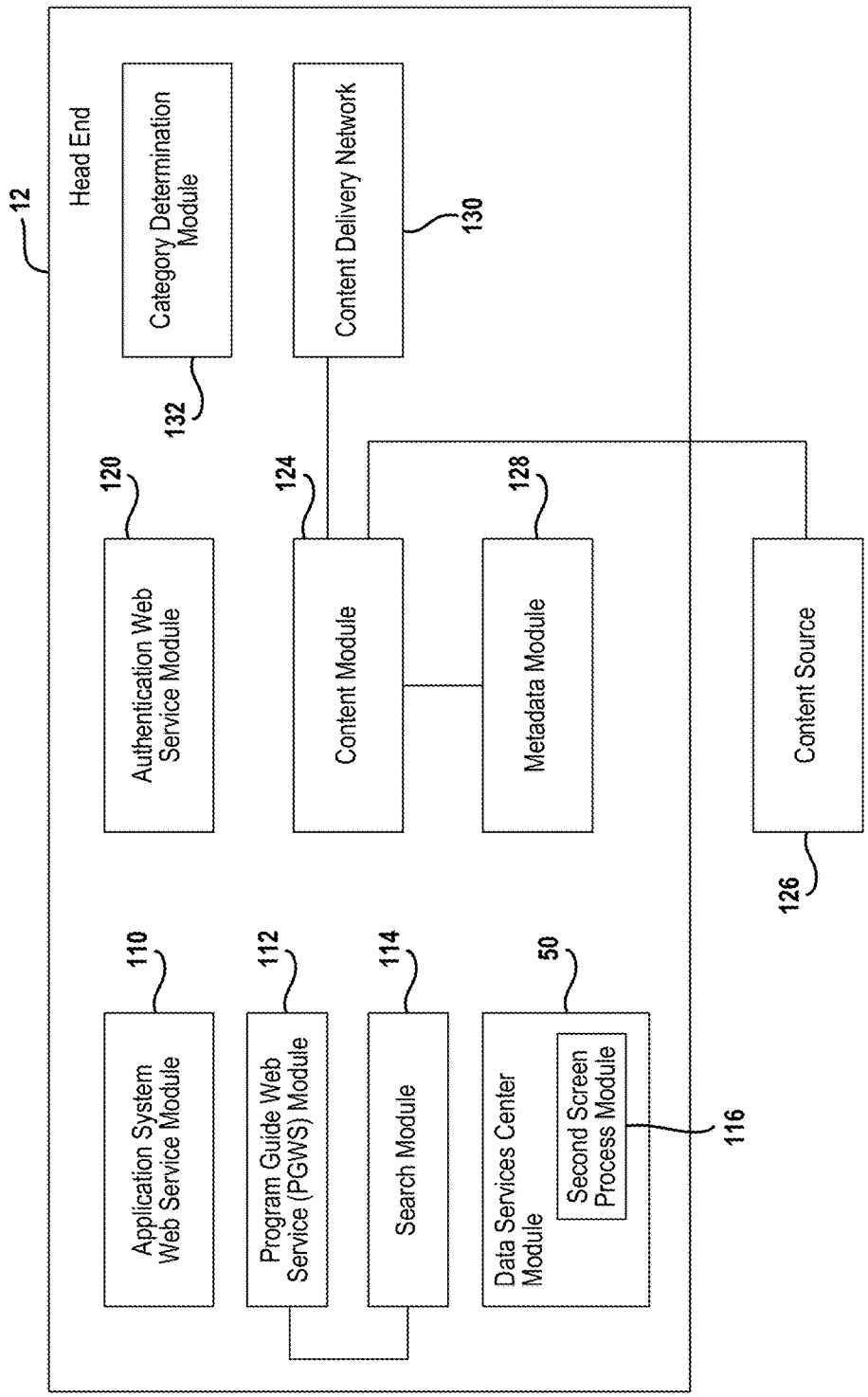
FIG. 2 is a high level block diagrammatic view of the head end of FIG. 1.

Referring now to FIG. 2, the head end 12 is illustrated in further detail. The head end 12 may include various modules that are interconnected. The interconnections have been eliminated in the figure for simplicity. The head end 12 is illustrated as being within one facility. However, various numbers of facilities with different numbers of modules may be used in an actual implementation.

The head end 12 may include an application system web service module 110. The application system web service module 110 may be a configuration service that provides site definitions, host uniform research locators and application settings. The application system web service module 110 may be used to call other web services such as the program guide web service 112. Interaction of the application system web service 110 will be further described below.

The program guide web service module 112 provides a listing of content to various devices including the set top box 22. The program guide web service module 112 may provide details for a grid guide or specific data for a specific channel. The program guide web service module 112 may deliver the program data, channel data, ratings data or other forms of data to the user device through the network 36 illustrated in FIG. 1.

The program guide web service module 112 may also have categories associated with each of the various types of content. The program guide web service module 112 may provide a description and titles for each video-on-demand content available. Each of the content may have a unique content identifier associated therewith. Each content may have a poster for display on the screen display.

The head end 12 may also include a search module 114. The search module 114 may provide searching based upon various received search criteria. Searching may be performed by actor, title, or by category. Categories may be generic genre's set forth by the content providers. Other categories may be formed by the service provider in charge of the head end 12. As will be used below, a number of content categories, such as adventure, laughs, fantasy, Sci-Fi, animation, drama and the like may be set forth. Content such as video-on-demand content or over the air content may be classified into one or more of the content categories. Search results may be provided from the search module 114 by providing a list of content titles found during the search, a brief description of the content and various other types of data. In some forms merely a content title may be returned. However, if further information is desired a further request for more information may be performed.

The data services center 50 is also illustrated as being incorporated within the head end 12. The data services center 50 may include a process module 116 for providing user device data to user devices with the system. As mentioned above, the data services center 50 may be used to aggregate various data from various sources that it may be provided to the user device upon request.

The head end 12 may also include an authentication web service module 120. The authentication web service 120 may act as a lookup service to authenticate a user device such as the set top box or the user device. The authentication web service module 120 may also be used as a setup service that is used to setup the user device based on various user parameters. Such user parameters may include the type of device and the services subscribed to. Some services may be selectively provided to user devices for a fee.

The head end 12 may also include a content module 124. The content module 124 may store content therein. The content module 124 may store movies or sports or other on-demand types of content. Some content may be communicated on a pay-per-view basis. Pay-per-view is communicated on a linear channel at a predetermined time. The content module 124 may also be used to communicate live content to users from a content source 126. The content source 126 may provide live or linear content. Linear content is content that is broadcasted at a prescheduled time according to a predetermined schedule. Nonlinear content, such as on demand content, is different than pay-per-view and is broadcasted upon request and not according to a preset schedule.

A metadata module 128 may also provide data that is broadcasted with the content. The metadata module 128 may also provide data to the program guide web service 112. The metadata module 128 may also include closed captioning, ratings data, or other data that is broadcasted with the content or program guide.

A content delivery network 130 is used to broadcast content to the set top boxes. The content delivery network 130 may broadcast formatted signals such as packetized signals. The formatted signals may be broadcasted through the satellite 18 or may be communicated through the network 36 illustrated in FIG. 1.

The head end 12 may also include a category determination module 132. The category determination module 132 may generate categories from content available from an external source such as the TIMES MEDIA SERVICE®. Of course, head end 12 may generate custom categories to be used. For example, if a system is intended for young people, categories may include only content available from certain channels. The category determination module 132 may also combine conventional categories into various categories for screen display within bounded areas of the screen display as will be described below. A list of categories to the user device through the network.

Figure 3:
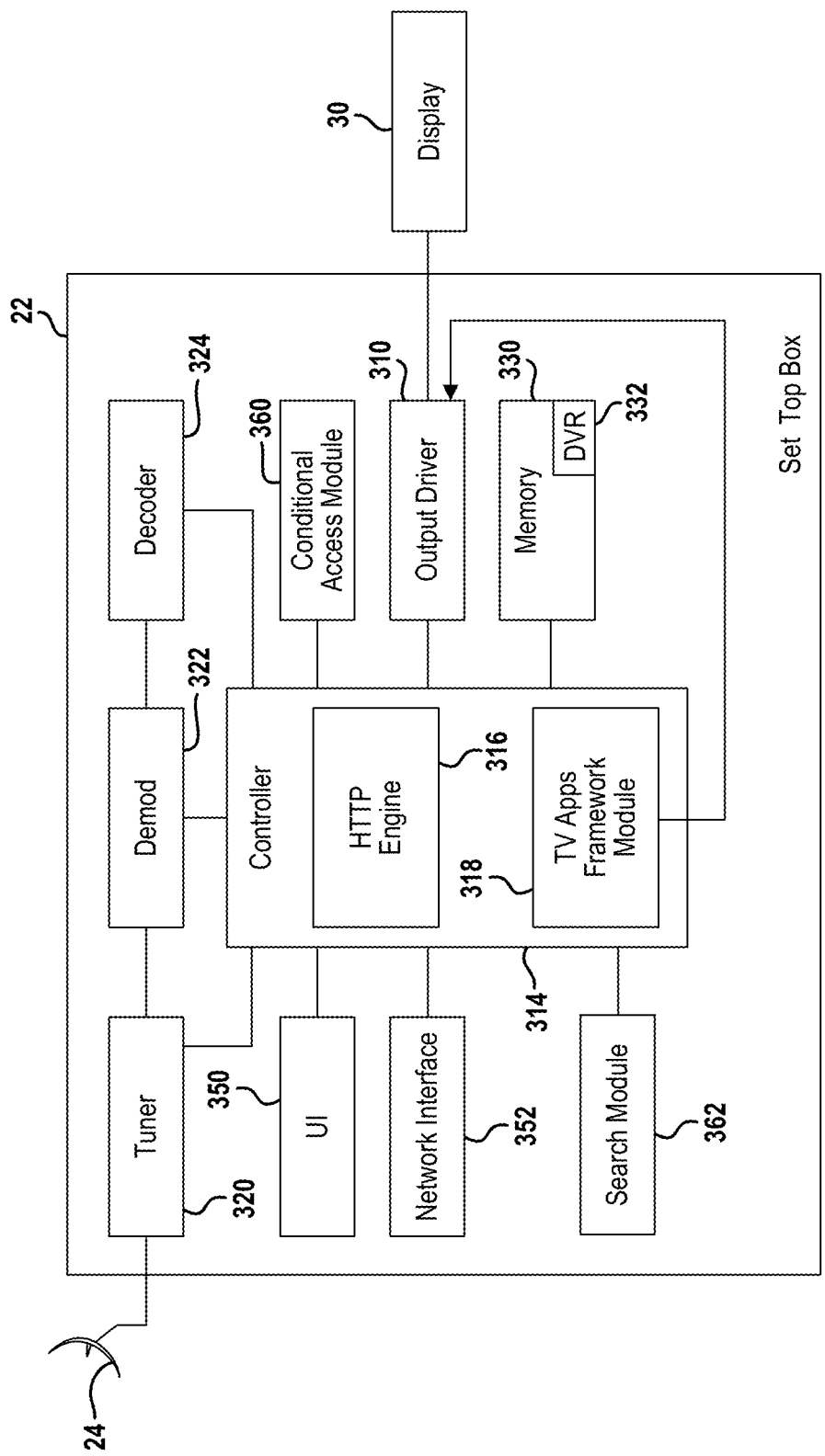
FIG. 3 is a high level block diagrammatic view of the set top box of FIG. 1.

Referring now to FIG. 3, the set top box 22 is illustrated in further detail. Although, a particular configuration of the set top box 22 is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for different orbital slots may be used. In a cable system no antenna may be used. Rather, a connector to a cable may be used. The set top box 22, as described above, is coupled to a display 30. The display 30 may have an output driver 310 within the set top box 22.

A controller 314 may be a general processor such as a microprocessor that cooperates with control software. The controller 314 may be used to coordinate and control the various functions of the set top box 22. These functions may include a tuner 320, a demodulator 322, a decoder 324 such as a forward error correction decoder and any buffer or other functions.

The tuner 320 receives the signal or data from the individual channel. The tuner 320 may receive data from a satellite or a terrestrial source such as a cable. The tuner 320 may receive television programming content, program guide data or other types of data. The tuner 320 may be tuned to a particular channel under the control of the controller 314 for recording or displaying a particular channel or content.

The demodulator 322 demodulates the signal or data to form a demodulated signal or data. The decoder 324 decodes the demodulated signal to form decoded data or a decoded signal. The controller 314 may be similar to that found in current DIRECTV® set top boxes which uses a chip based multifunctional controller. Although only one tuner 320, one demodulator 322 and one decoder 324 are illustrated, multiple tuners, demodulators and decoders multiple tunes, demodulators and decoders may be provided within a single set top box 22.

The controller 314 may also include a hypertext transfer protocol (HTTP) engine module 316 and a television application framework module 318. The HTTP engine module 316 (HTTP engine) is used to receive commands through the local area network 44. The commands in this example are received from the user device 40. The HTTP engine module 316 receives the commands that are acted upon by the controller 314. When the HTTP signals are received at the HTTP engine 316 are remote control commands, the HTTP engine exposes the underlying commands from the signal which are acted upon by the controller 314. The remote control commands may be the same commands that are used by a remote control device that are used to control the set top box 22. Other commands may be received at the HTTP engine 316 such as a tune command to tune a tune the tuner 320 to a particular channel for viewing or recording or storing within the set top box 320.

The television (TV) application framework module 318 is used for launching various applications such as a widget that is viewable on the television. The widgets may be displayed on top of the video on the display 30. In this particular example, the television application framework module 318 may be used to communicate with the data services center 50 illustrated in FIG. 1. The TV application framework module 318 may request data for user accounts, program information, sports data, or the like from the data services center 50. The TV application framework module 318 may receive the requested data and display the data in a particular format or position on the display 20.

The controller 314 is in communication with a memory 330. The memory 330 is illustrated as a single box. The memory 330 may actually be a plurality of different types of memory including the hard drive, a flash drive and various other types of memory. The memory 330 may be other types of memory or sections of different types of memory. The memory 330 may be nonvolatile memory or volatile memory.

The memory 330 may include storage for various operational data collected during operation of the set top box 22. For example, the memory 330 may store various types of data including set top box playlist data that has the playlist for content saved within the memory 330. Another type of data stored in the memory is the favorite settings for the set top box 22. Another type of data in the memory 330 may include the channels subscription data, the blocked channels, adult channels, rating limits set by the set top box 22, current set top box language, prioritizer data, TV resolution data, to do list data, the conditional access module identifier, time zone data, time of day daylight savings, status data, aspect ratio data, viewing hours data, quick tune list and a zip code.

The memory 330 may also store the advanced program guide data. The memory 330 may store program guide data that is received at the head end. The program guide data may include amounts of data including two or more week's worth of program guide data. The program guide data may be communicated to the set top box 22 in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier, producer data and event type. The data may also include various other settings.

The memory 330 may also include a digital video recorder 332. The digital video recorder 332 may be a hard drive, flash drive, or other memory device. A record of the content stored in the digital video recorder is a playlist. The playlist may be stored in the DVR 332 or other parts of memory 330.

The set top box 22 may also include a user interface 350. The user interface 350 may be various types of user interfaces such as a keyboard, push buttons, a touch screen, a voice activated interface or the like. The user interface 350 may be used to select a channel, select various information, change the volume, change the display appearance, or other functions. The user interface 350 may also be used for selecting recommendation and providing feedback for recommendations as will be described below.

A network interface 352 may be included within the set top box 22 to communicate various data through the networks 36/44 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The set top box 22 may also include a conditional access module 360. The conditional access module 360 prevents unauthorized reception of the television signals through the antenna 24. The conditional access module 360 may use a cryptographic hash to authorize the use and display of the received signals.

The set top box 22 may also include a search module 362. The search module 362 may be used to search the program guide data in response to a selection of a category or categories at a screen display. The content categories may be communicated to the set top box 22 using the local area network. IP signals corresponding to the content categories may be communicated to the set top box.

Figure 4:
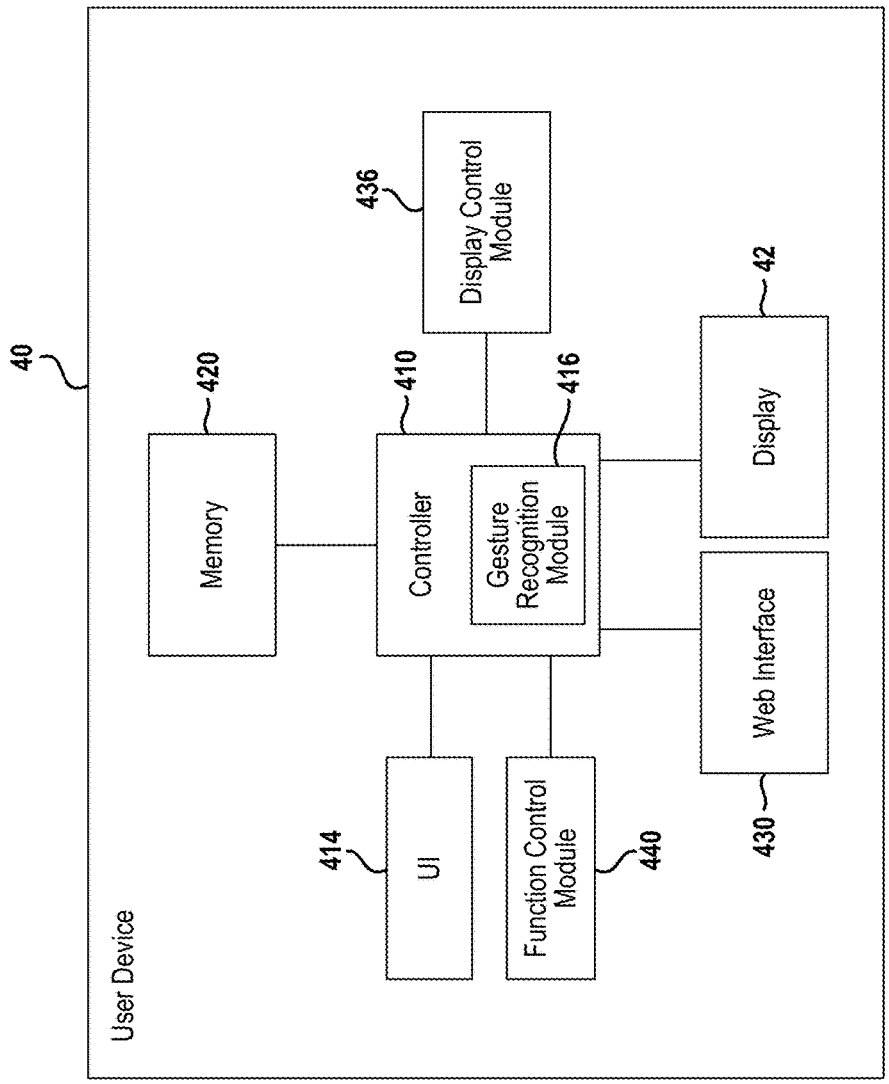
FIG. 4 is a high level block diagrammatic view of a user device of FIG. 1.

Referring now to FIG. 4, a block diagrammatic view of the user device 40 illustrated in FIG. 1 is set forth. As mentioned above, the user device 40 is a user device that includes a display or screen. The user device 40 may be a tablet computer, a laptop computer, a mobile phone, or the like. One example of such a device is an iPad® Apple Corp.

The user device 40 includes a controller 410. The controller 410 may include a central processing unit that is microprocessor-based. The controller 410 performs various functions including controlling a screen display 42. The controller 410 is also in communication with a user interface 414. The user interface 414 may be one or a combination of different types of user interfaces depending upon the device. Many tablet computers include pushbuttons or touch screens or both. Keyboards, styluses, pointer devices (such as a mouse) and other types of input devices may generate input signals that are used as a user interface 414 to the user device. The user interface 414 is used to provide various inputs and responses to elements displayed on the screen display 42. When the user interface 414 is a touch screen or touch display, the screen display 42 and the user interface 414 may be one in the same. More than one user interface 414 may be incorporated into the user device 40.

The controller 410 may include a gesture recognition module 416. A gesture originates from a bodily motion associated with a touch screen. Gestures are interpreted by a mathematical algorithm within the gesture recognition module 416. Various types of gestures may perform various functions depending upon the screen display. In the present example, a media player may be sized by "pinching" or "spreading" the media player window. Touching, sliding or other gestures may be performed with the different meanings based on the screens displayed and the context. Other gestures, such as a swipe gesture, also move or initiate a particular procedure. Signals such as a movement signal may be generated at the gesture recognition module 416. Touching the touch pad in a particular location may activate a menu. In the present example, a combination gesture such as a touch followed by an upward swipe motion on the screen display may communicate a tune signal to the set top box. The gesture recognition module 416 mathematically recognizes a touching or a plurality of touchings of the touch screen and initiates a function performed by the controller 410 in conjunction with other modules within the user device 40.

A memory 420 is also in communication with the controller 410. The memory 420 may include different types of memory that store different types of data. The memory 420 may store operating software for the device, operating data, user settings, video, music, documents, and applications. The applications may perform various functions, including an application for communicating with a set top box 22 illustrated in FIGS. 1 and 3 and obtaining data from the set top box and data services center. The application may allow the user device 40 to communicate directly with the data service center 50. A web interface 430 may be used for communicating with the data services center 50 and the set top box 22. The web interface 430 may allow a connection to the network 36 and network 44. The web interface 430 may allow communication through a wireless network such as a local area network, a wide area network or a mobile or cellular network.

In the present example, the controller 410 allows the user to customize the screen display 42 to display various types of data in a user-controlled format. That is, the screen display 42 may be customized to display the data desired by the user. The user device 40 may act as an extension of the set top box 22 and display 30 as illustrated in FIG. 1 to display additional information about the programming shown through the set top box 22. The data is received through the web interface 430.

The user device 40 may also include a display control module 436. The display control module 436 may control the screen display associated with various menus. The display control module 436 may define a plurality of display areas within a plurality of respective boundaries. That is, a first display area on the screen display may correspond to a first boundary. A second display area may correspond to an area within a second boundary. Each boundary may be a regular shape such as a circle, square or hexagon. The boundary is a closed shape that defines a control surface that, when touched, enables the area or the shape within the boundary to be moved upon the sensing of a movement signal sensed by the display area. A plurality of display areas may be simultaneously displayed by the display control module 436. The display areas, as mentioned above, are defined by boundaries therearound. The display areas may also include graphical representation such an image and/or text for a title of category. Various categories, by way of example, include, but are not limited to adventure, laughs, animation, science fiction and fantasy. Should the system be used for other functions, such as an alarm system, the various functions may correspond to different sensors such as a front window sensor, motion sensors, front door sensor, side door sensor, a left side window sensor, or groups of sensors. Profiles may also be formed in a similar manner. Profiles for different purposed such as parental control may be formed in a similar manner. Parental control may allow different ratings of content as well as allowing restriction to certain channels or content descriptions. The user interface module 414 and the display control module 436 may act in conjunction. Input from a touchscreen may be sensed by the user interface, 414. Gestures on the user interface 414 may be recognized by the gesture recognition module 416. The user interface 414 and display 42 may be combined in one unit in the case of a touch screen display.

A function control module 440 may also be in communication with the controller 410. The function control module 440 may perform various functions according to the function of the user device 40. The function control module 440 may perform the various functions based upon inputs sensed at the user interface 414 in conjunction with the display control module 436. Performing a search, arming an alarm system or setting a parental profile are all examples of functions that may be controlled by the function control module 440.

Figure 5:
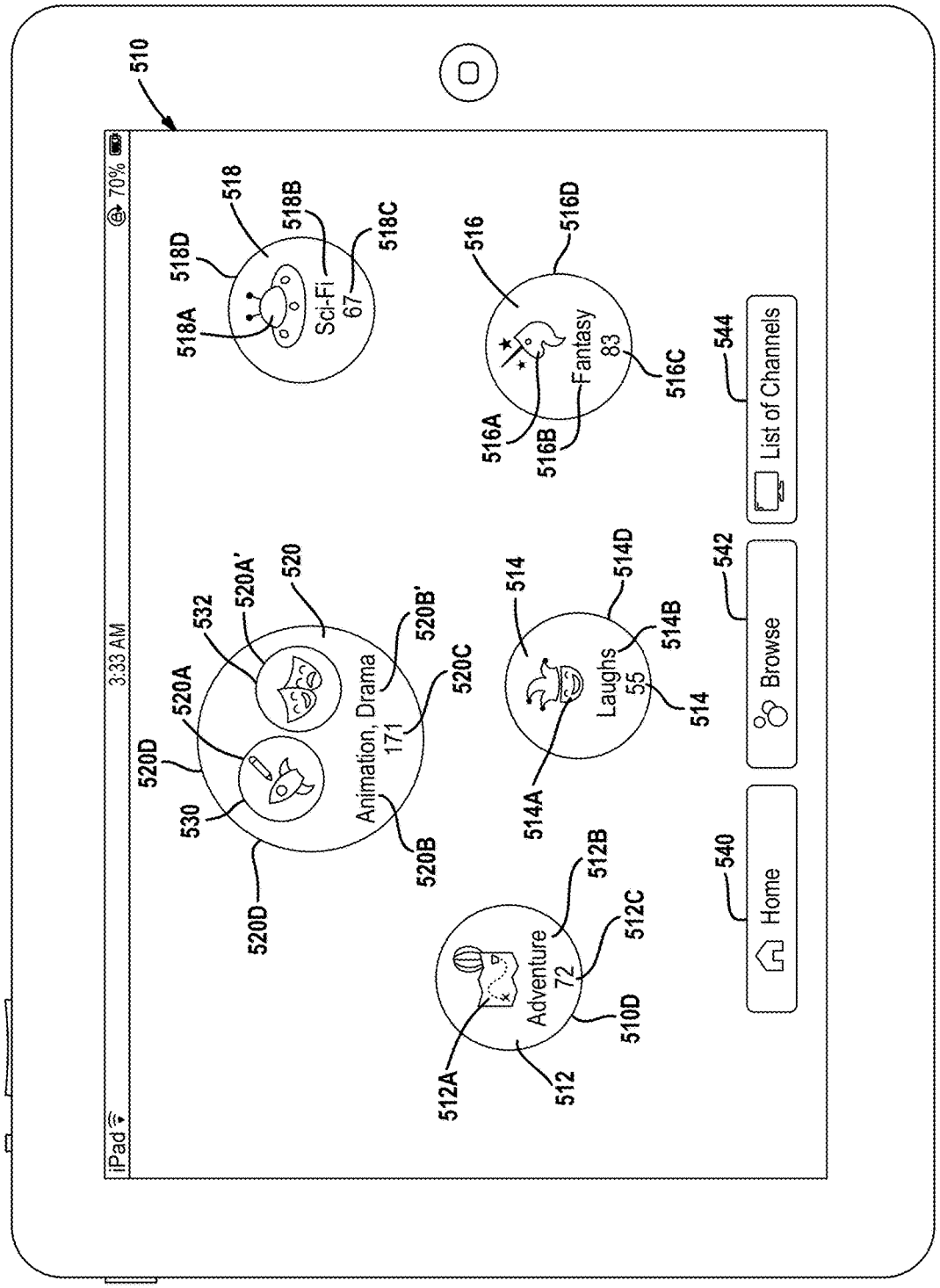
FIG. 5 is a screen display illustrating plurality of display areas including a combined display area.

Referring now to FIG. 5, a screen display 510 is illustrated having a plurality of display areas 512, 514, 516, 518, and 520 that corresponds to one or more categories or search filters. In this example, the system is used for searching television content and filtering a large quantity of data according to search filter terms. In this example, the display area 512 corresponds to an adventure category. The display area 514 corresponds to a laugh category. The display area 516 corresponds to a fantasy area. The display area 518 corresponds to a science fiction area. The display area 520 corresponds to an animation and drama display area 520. The display areas 512-518 are relatively small in area because each corresponds to a single category. The display area 520 is increased in area compared to display areas 512-518 because two categories are combined. A user operating the device with a screen display 510 can select one of the display areas for generating a list of content that corresponds to selected category by interaction with a user interface.

In the case of display area 520 both animation content and drama content may be displayed for selection on the screen display. More than two different display areas may be combined to form the combined display area 520. By "dragging and dropping," another display area may be combined with display area 520. It should also be noted that the display area 520 may be broken apart by dragging one side of the display area. This will be described further below.

Each of the display areas 512-520 may include corresponding indicators that are denoted by the screen display reference number with the addition of the letter A for a graphical indicator, a textual indicator by adding reference letter B and a numerical indicator by adding reference letter C. The outside boundary of each display area is denoted by the addition of the letter D to the area reference numeral. For example, display area 512 has a category indicator 512A, a textual indicator 512B and numerical indicator 512C. The laughs display area 514 includes category indicators 514A-514C. Display area 516 includes category indicators 516A-516C. Display area 518 includes category indicator 518A-518C. In the case of the display area 520, indicators 520A and 520A' are graphical indicators, 520B and 520B' are textual indicators and 520C and 520C' are numerical indicators. Separate smaller bubbles or sub-areas, 530 and 532 may be included within the overall boundary 520D. By selecting the area within the subarea or bubble, the larger display area encompassing both categories may be separated as described and illustrated below.

The screen display 510 may also include a home button 540, a browse button 542 and a channels button 544. The home button 540 may take a user out of the searching function when selected. A browse button 542 may bring up a plurality of programs or on-demand content that are generally recommended by or not searched for under the categories described earlier. The channels button 544, when selected, may bring up a list of current channels that stream content to the user device.

Figure 6A:
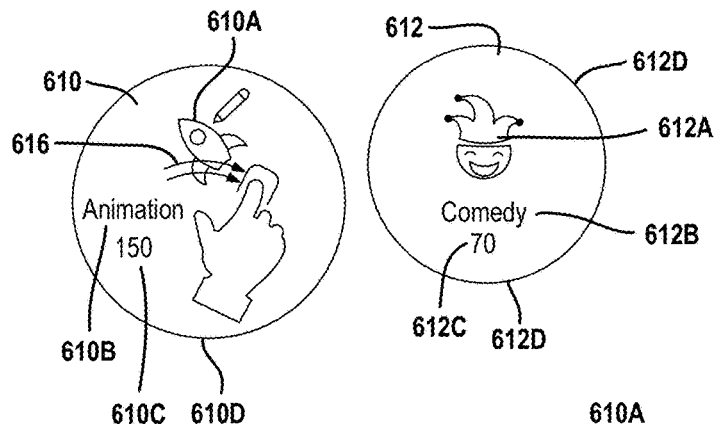
FIG. 6A is a representation of movement of one display area relative to another display area.

Referring now to FIG. 6A, a first display area 610 corresponding to a first filter term and second display area 612 corresponding to a second filter term are moved relative to each other as indicated by the arrow. The same convention relative to adding letters to the display area number is in FIGS. 6A-6B. In this example, the first display area 610 is selected by touching the first area within the boundary 610A. When the area within the boundary 610D is selected, such as by selecting or performing a stationary screen gesture within first display area 610, the entire area 610 including the boundary 610D may be moved in the direction desired by the user and indicated by the arrow 616. The first graphical category indicator 610A that corresponds to a symbol, the textual category indicator 610B and the numerical category indicator 610C are moved toward the second display area 612. The second graphical category indicator 612A that corresponds to a symbol, the textual category indicator 612B and the numerical category indicator 612C are included in the second display area 612.

Figure 6B:
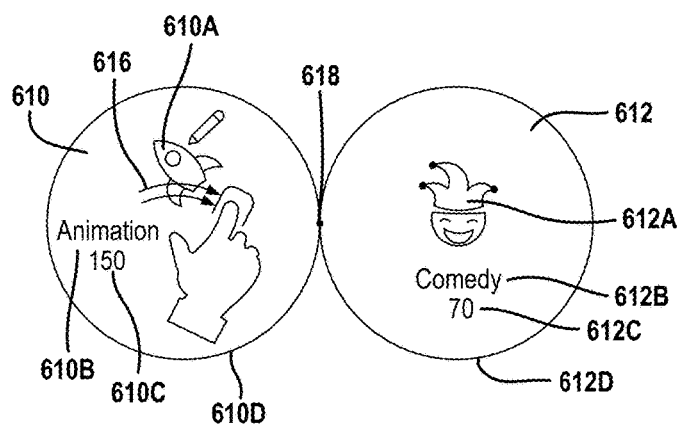
FIG. 6B is a screen display illustrating the intersection of two display areas.
Figure 6C:
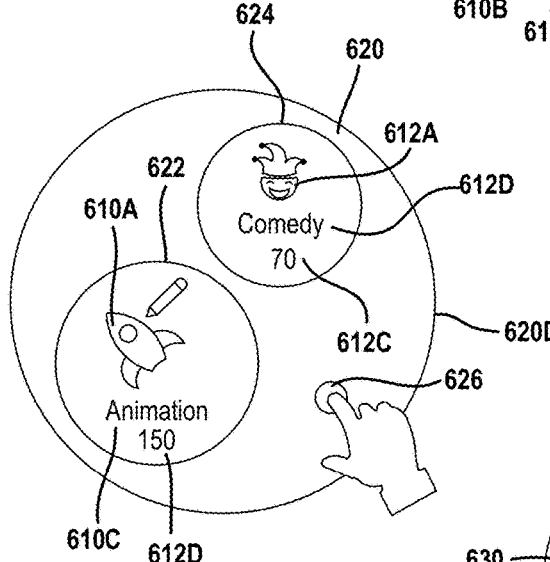
FIG. 6C is a combined display area suitable for selecting a content list.
Figure 6D:
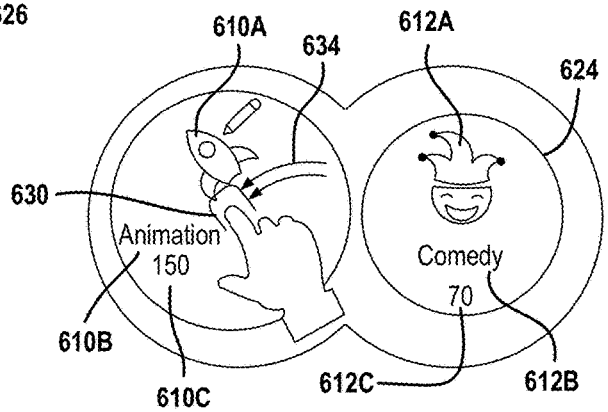
FIG. 6D illustrates a combined display area being separated.

Referring now to FIG. 6B, when the boundaries 610D and 612D intersect, touch or overlap such as at an intersection point 618, the first display area and the second display area may be combined to form a third display area 620 as illustrated in FIG. 6C. Sub-area 622 around the graphical indicator 610A and sub-area 624 around graphical indicator 612A may be generated to allow the area display 620 to be separated as illustrated in FIG. 6D. The textual indicators and numerical indicators may be displayed within or outside the sub-areas 622, 624. By tapping, double tapping or performing some other gesture at the third display area 620, a function associated with the gesture may be performed. In this example, a search may be performed of available content in the animation and comedy categories, since the display area 620 includes both. A tapping movement indicated by spot 626 within third display area 620 may be sensed by the gesture module of FIG. 4.

Referring now to FIG. 6D, when the sub-area 622 corresponding to the graphical category indicator 612A or the textual category indicator 622 is selected or touched as indicated by area 630, the display areas may be separated from third display area into the first display area 610 and second display area 612 as illustrated in FIG. 6A. By forming the desired gesture as sensed by the gesture recognition module the display areas may be separated.

Figure 7:
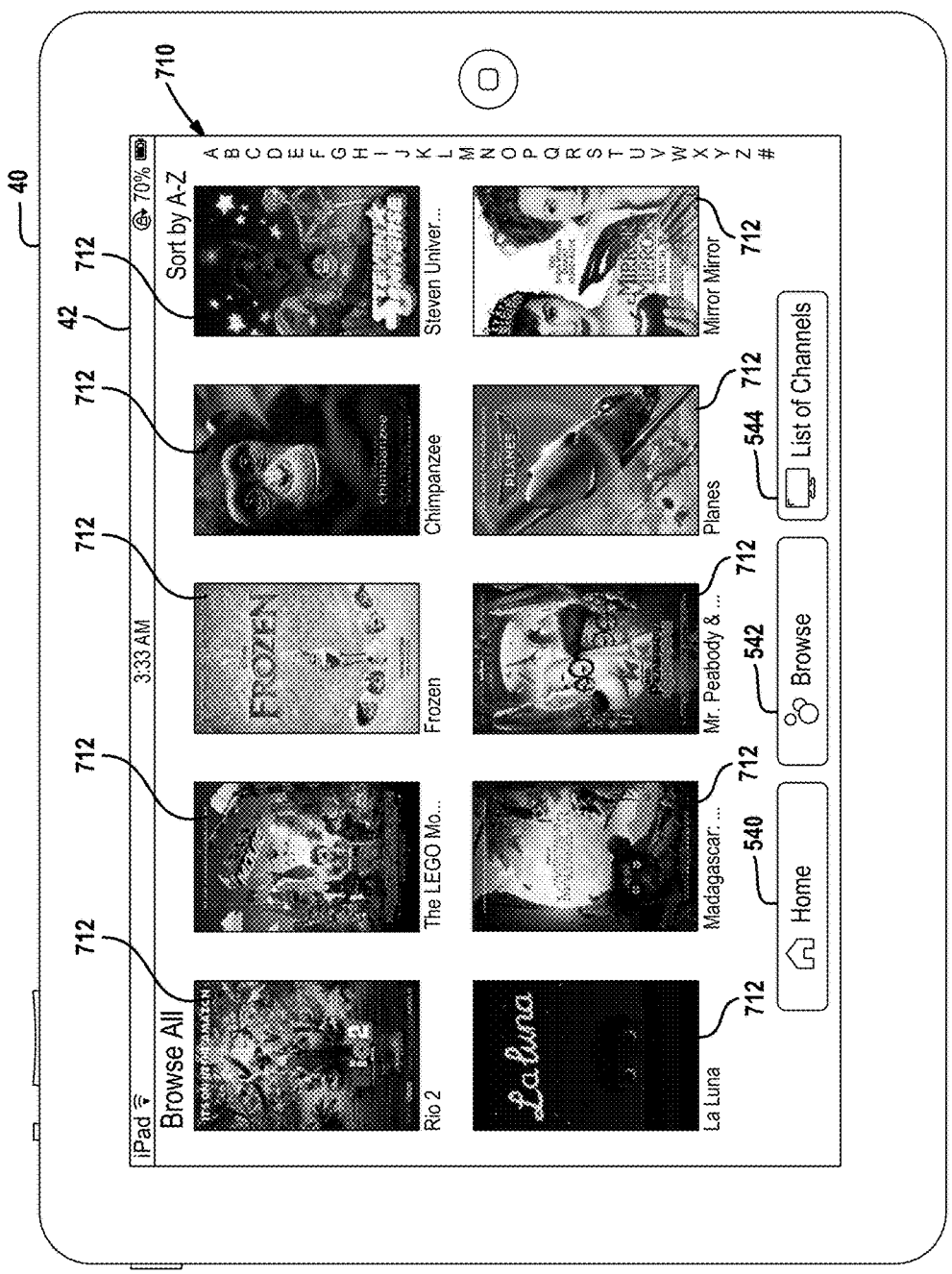
FIG. 7 is a screen display of a content list illustrating all content available for streaming.

Referring now to FIG. 7, a screen display 710 of the user device 40 is illustrated when a plurality of content is selected. In this example all content corresponding to all of the categories is displayed. In this example Rio 2, The Lego Movie, Frozen, Chimpanzee, Stephen Universe, Luna, Madagascar, Mr. Peabody and Sherman, Planes and Mirror Mirror are all displayed as posters 712. By performing a gesture such as single clicking, double-clicking or a sliding movement within the boundaries of poster 712 or the adjacent text the content may be selected. The selection of the content may communicate a signal to the head end so that the content is streamed to the user device 40. The content may be streamed through the local area network or directly through the external network such as the cellular network system.

Figure 8:
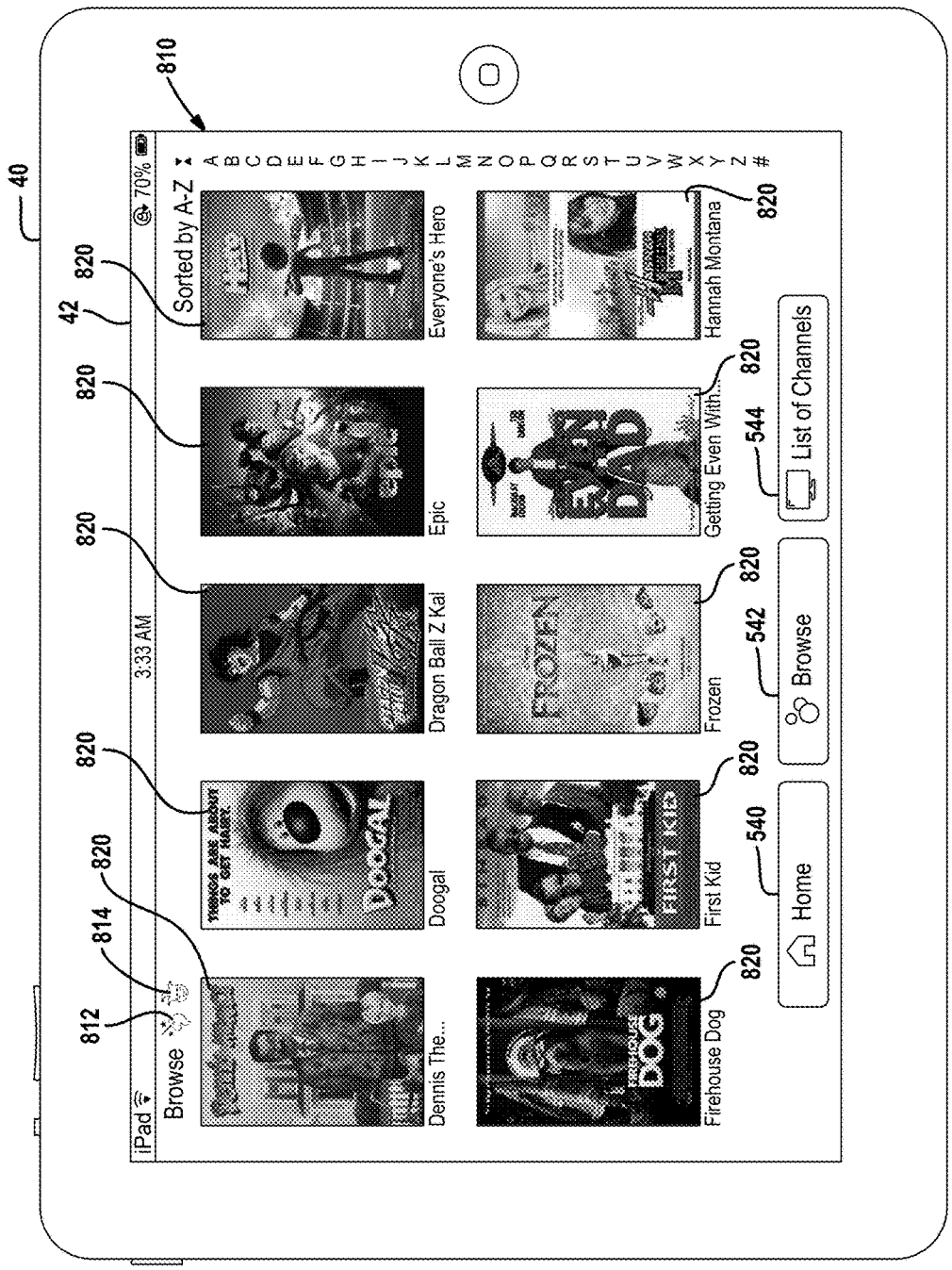
FIG. 8 is a screen display of filtered content available for streaming.

Referring now to FIG. 8, a screen display 810 is illustrated having a graphical category indicator 812 corresponding to fantasy and graphical category indicator corresponding 814 corresponding to laughs. In this example a combined display area similar to that illustrated in FIG. 5 as reference numeral 520 may used to generate the screen display 810 of FIG. 8. Only content in these categories may be displayed. In this example, Dennis the Menace, Doogal, Dragonball Z Kai, Epic, Everyone's Hero, Firehouse Dog, First Kid, Frozen, Getting Even With Dad, and Hannah Montana are illustrated as posters 820. As mentioned above, one of the posters 820 may be selected using a gesture and streamed to the user device. The content posters displayed in FIG. 8 may have been filtered by parental controls prior to displaying to form a parental control filtered content list.

Figure 9A:
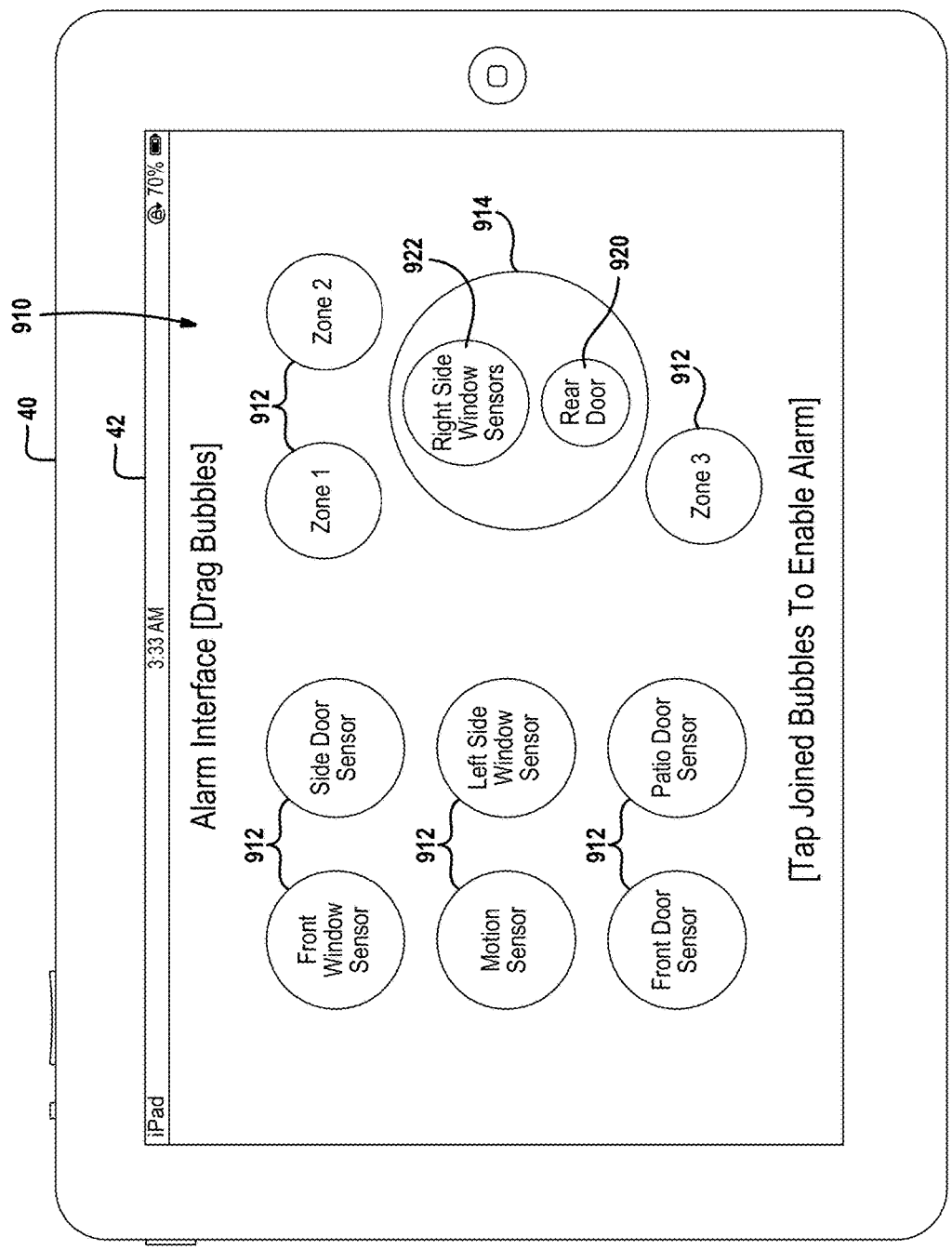
FIG. 9A is a screen display of an alarm interface having various interface areas.

Referring now to FIG. 9A, a screen display 910 displayed on the display 42 of the user device 40 is illustrated for an alternate example corresponding to alarm system. In this example a plurality of display areas 912. Each of display areas 912, in this case, corresponds to a single sensor or group of sensors. Display area 914 corresponds to a user defined group that includes both the right side window sensors illustrated in a sub-area 920 and a rear door sensor illustrated in a sub-area 922. The display area 914 was formed by combining two display areas. By selecting the display area 914 the function performed may be enabling or disabling the various sensors set forth therein. By individually selecting the display areas 912, the front window sensors, side door sensors, motion sensors, left side window sensors may all be enabled individually. By selecting the display area 914 and therein, the right side window sensors and the rear door sensor may be enabled simultaneously. The selection and deselection of various sensors may take place using the screen display 914.

Figure 9B:
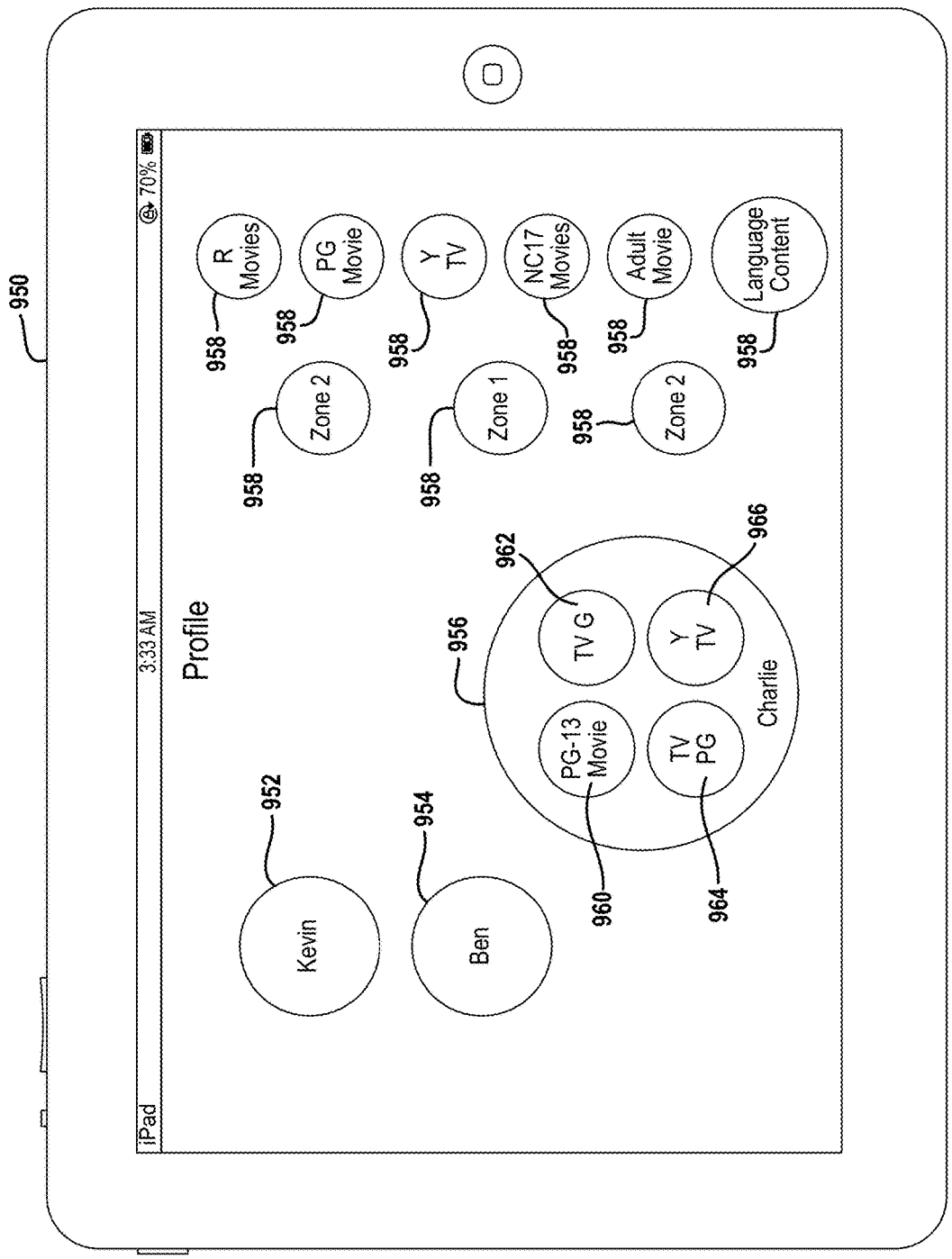
FIG. 9B is an illustration of a screen display for forming a parental control profile.

Referring to FIG. 9B, a screen display 950 displayed on the display 42 of the user device 40 is illustrated for forming a profile. The people in the household may each have a separated display area. In this example, the display areas that do not have profiles assigned thereto are the display area corresponding to Kevin at 952 and Ben at 954. The Charlie profile display area 956 has several TV ratings and movie ratings assigned thereto. In this example, PG13 movie sub-area 960, TV G sub-area 962, TV PG sub-area 964 and Y TV sub-area 966 are all allowed by the Charlie profile display area 956. Individual ratings are illustrated by the display area 958. In this example the display areas corresponding to the ratings are "suggestive dialog", violence, TV 14, R movies, PG movies, Y TV, and NC17 movies, adult movies, and language content. Of course, other ratings are possible. To enable a profile for the particular rating the user generates a movement signal at the user interface and intersects the person display area such 952, 954 or 956 with the rating display area 958. Ratings may be added or subtracted to the person display areas using the process set forth in FIGS. 6A to 6B. The process may be modified so that when one sub-area is included in a personal profile, the profile does not disappear from the screen. This allows the same rating to be used in various profiles.

Figure 10:
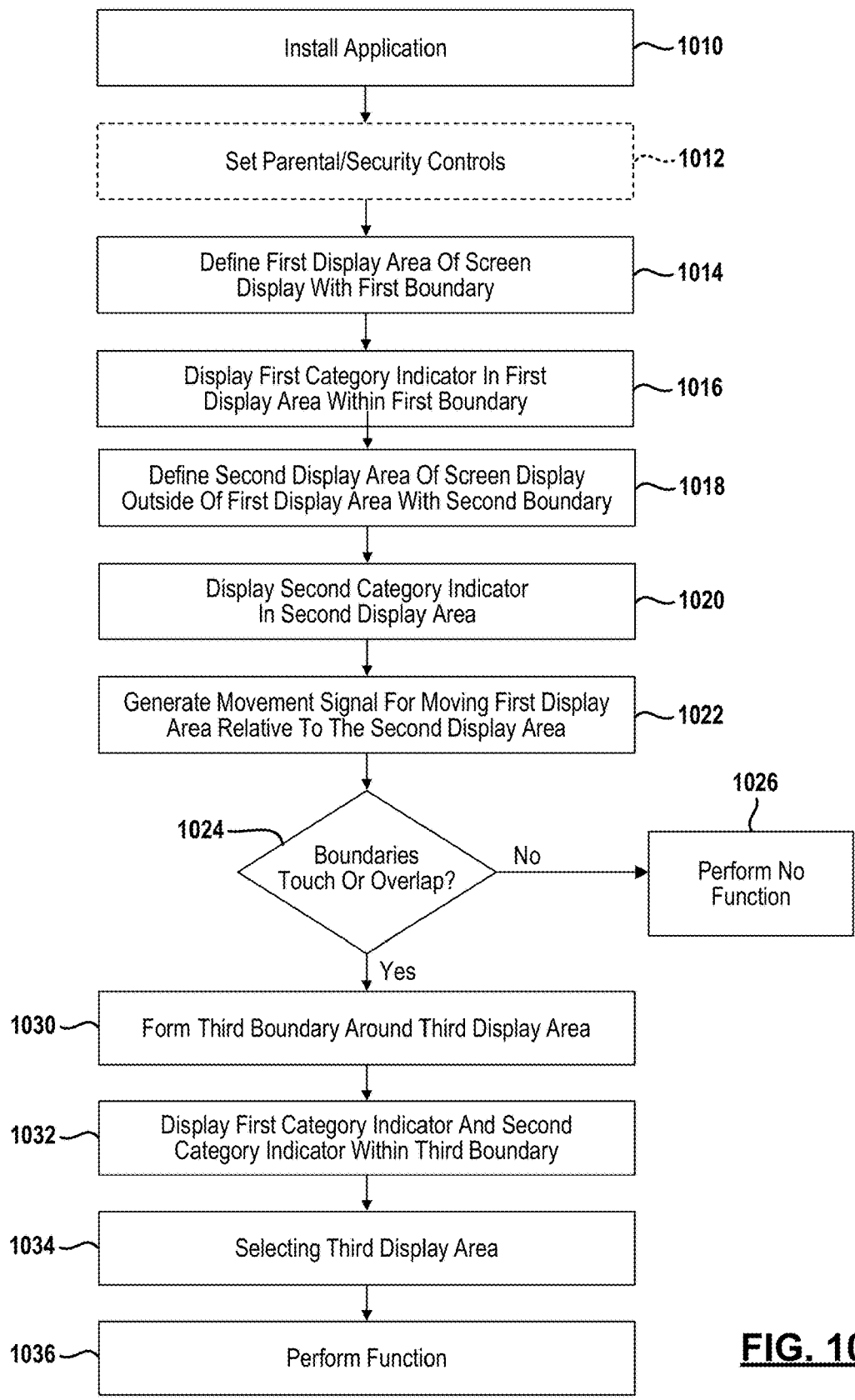
FIG. 10 is a flowchart of a method for operating a system using combined display areas.

Referring now to FIG. 10, a method for operating a user device and the system is set forth. In step 1010 an application is installed on the user device. This may be obtained from an application store or the like. Authentication using passwords and user identifiers may be performed when installing and using the application.

In step 1012 parental controls or security controls may be established. A password or other user identifier may be entered in this step. Further, a parental control setting may be used to set the various levels of parental control for the system. In step 1014 a first display area of a screen display is defined within the display control module 436 of FIG. 4. The first display area may be defined by a first boundary. The first boundary may be a physical geometric boundary or may be defined by a plurality of pixels. A closed geometric shape such as a polygon or circle may define the first boundary. In step 1016 a first category indicator may also be included in the first display area defined within the first boundary. As mentioned above a textual or graphical indicator may be displayed within the first display area.

A second display area is defined in step 1018. The second display area is defined on the screen display outside of the first display area. The second display area, as in the case of the first display area, may be defined by a geometric closed shape such as a circle or a polygon. Irregular shapes may also be used for both the first and second display area.

In step 1020 a second category indicator may be displayed in the second display area. The second category indicator may be graphical indicator, textual indicator, or both. In step 1022 a movement signal for moving the first display are relative to the second display area may be received by the gesture recognition module 416 of FIG. 4. The gesture may have to be performed in a certain manner corresponding to a certain movement on the screen display. For example, selecting a first display are for a predetermined amount of time then providing a movement signal for a particular direction such as toward the second display area may be performed. Of course, other types of movement may be performed to obtain a certain result. In step 1024 the movement of the first display area relative to the second display area may be performed. In this manner, the first boundary and the second boundary may be monitored to determine if they intersect or overlap. If the first boundary and the second boundary do not overlap or touch, step 1026 performs no function.

Referring back to step 1024, when the boundaries touch or overlap step 1030 is performed, the third boundary replaces the first boundary and the second boundary. The third boundary defines a third display area in step 1030. In step 1032, a first category indicator and a second category indicator are displayed within the third boundary area. The first category indicators correspond to the category indicators for the first display area and the second display area. In step 1034 the third display area is selected. The third display area may be selected using various gestures including selecting the third display area by placing a finger therein for a predetermined period. Single tapping or double tapping may also perform the selected function. In step 1036 a function is performed in response to selecting the area. As will be further described below, various types of functions depending on the system may be performed. Security system functions, profile functions and content selection functions may all be performed using the teaching set forth above.

Figure 11:
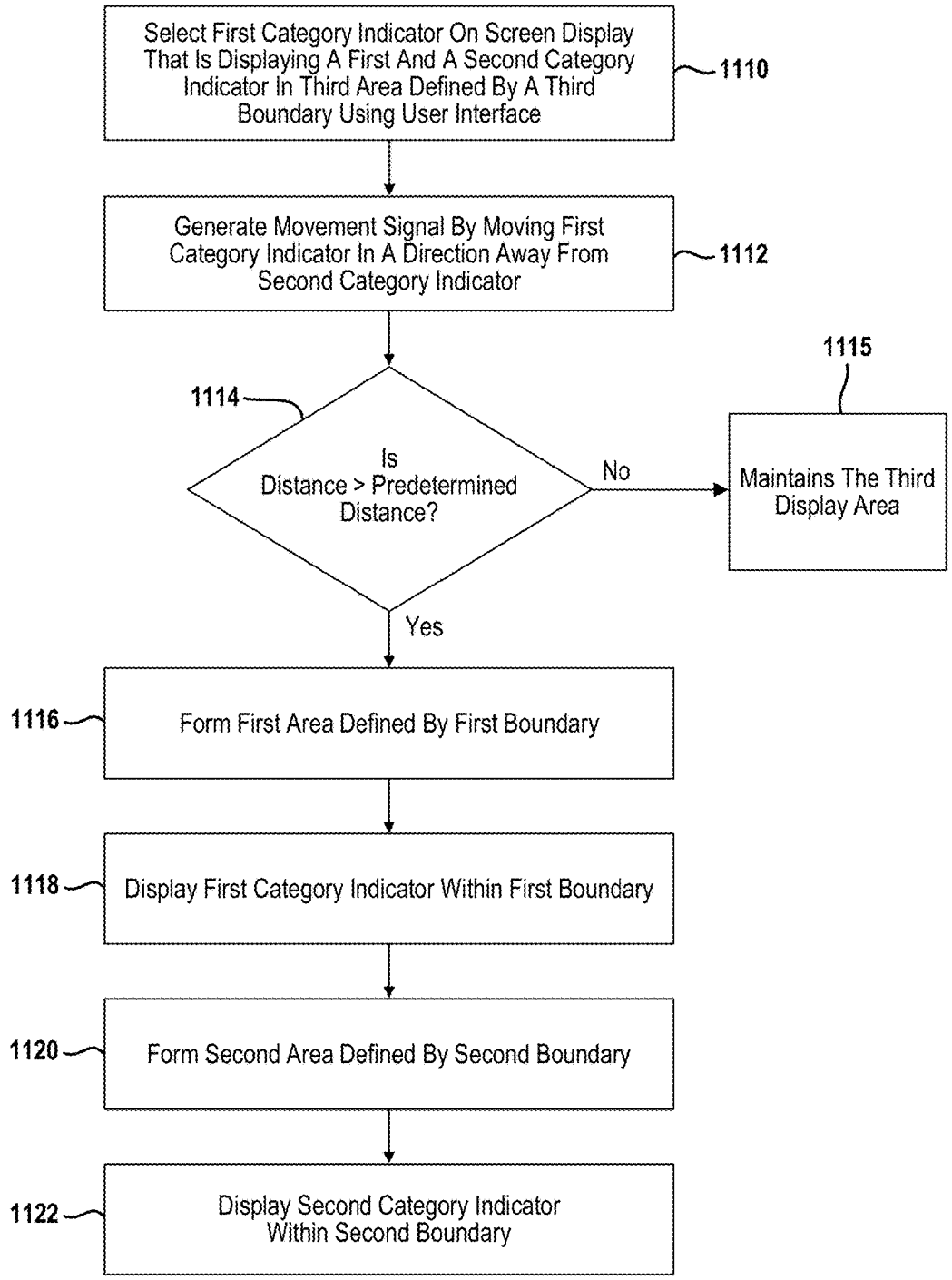
FIG. 11 is a method for separating display areas into two separate categories.

Referring to FIG. 11, a method for separating a combined category area into a single category area is set forth. In step 1110 a first category indicator that is to be removed from the combined display area is selected. From the more than one indicators. By selecting the area directly adjacent to or above the first category indicator the display control module and the gesture recognition module may recognize a predetermined gesture. In step 1112, a movement signal may be received by moving the first category indicator relative to a second category indicator. Again, this is recognized by the user device at the gesture recognition module of FIG. 4. In step 1114 when the distance between the first category indicator and the second category indicator is greater than a predetermined distance step 1116 is performed. When the distance is not greater than a predetermined distance in 1114, step 1115 maintains the third display area which is a combination of two categories.

Referring back to step 1114, when the distance is greater than a predetermined distance, step 1116 forms a first area defined by a first boundary. A first category indicator is displayed within the first boundary in step 1118. In step 1120, a second area is defined by a second boundary. In step 1122 the second indicator is displayed within the second boundary. In this manner two separate display areas are formed from a combined display area. The combined display area may have been formed using the methods set forth in FIG. 10.

Figure 12:
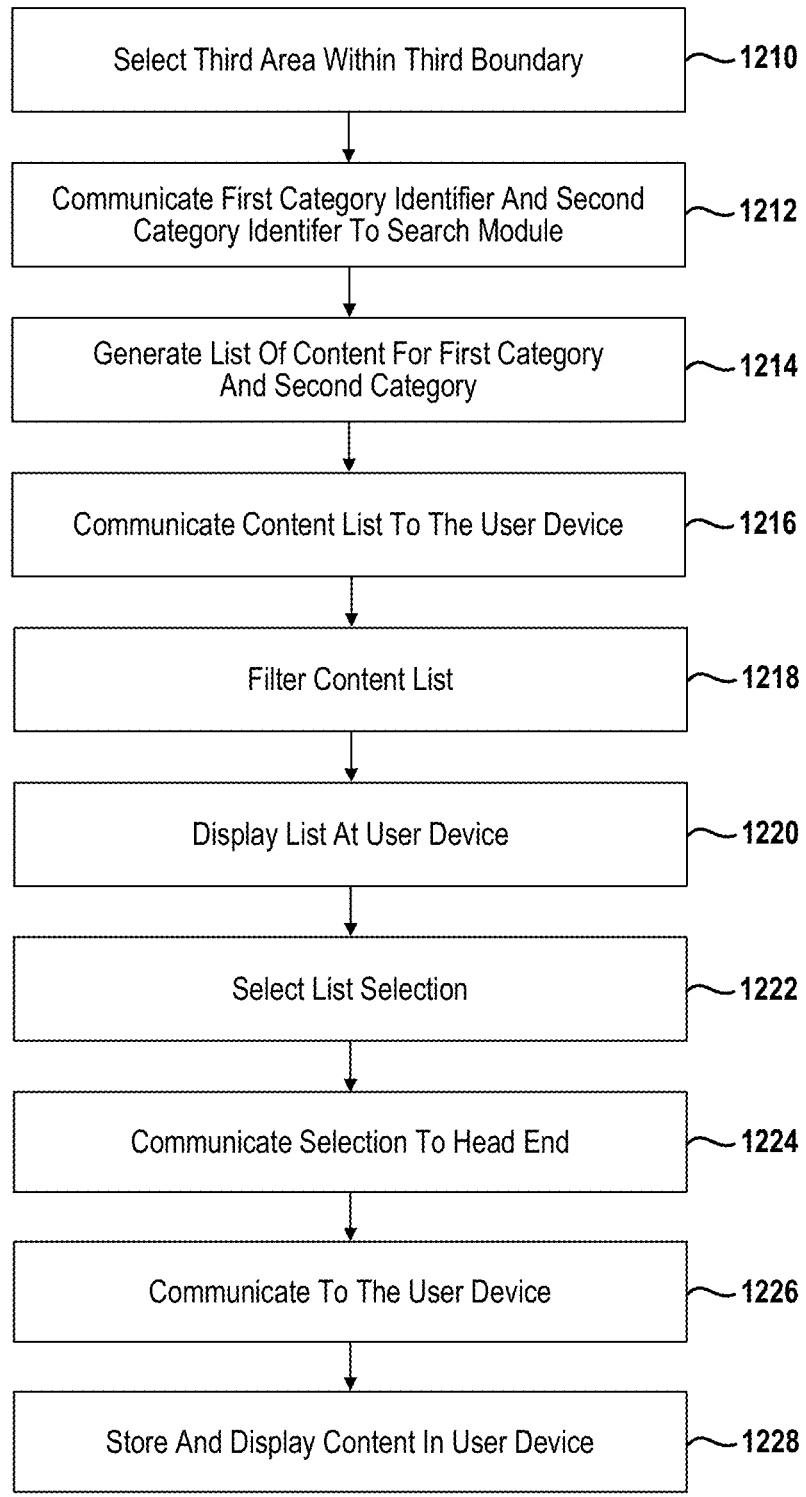
FIG. 12 is a flowchart of a method for performing a function at a video-on-demand content delivery system.

Referring now to FIG. 12, a method for performing a function in a content system is set forth. In this example, a video-on-demand content delivery system is set forth. In step 1210 a third area within a third boundary of a display area such as that described in FIG. 10 is selected. In step 1212 a first category and a second category identifier that is displayed within the third boundary is communicated to a search module through a network. The first category and the second category identifier maybe communicated through a local area network or directly through a cellular network and then through an internet or wide area network. In step 1214 as list of content available for the first category and the second category is generated at the search module. As mentioned above, the search module may be in the head end. It is also possible for the search module to be located at the or within set top box. In step 1216, the content list is communicated to the user device. Parental controls may also be established within the user device and thus the content list may be filtered in step 1218. This is an optional step. In step 1220, which may have been filtered, is displayed at the user device. The content list may include content identifiers, metadata associated with content and content titles. Of course some or all of the data may be displayed. For example, at minimum, content titles may be communicated to the user device for the content list. In step 1222, the content list may be selected using a user interface such as the touch screen. In step 1224, a selection signal corresponding to the content selection is communicated to the head end. In step 1226, the content corresponding to the content selection is communicated to the user device. In step 1228, the content may be stored and displayed on a screen display within the user device.

Figure 13:
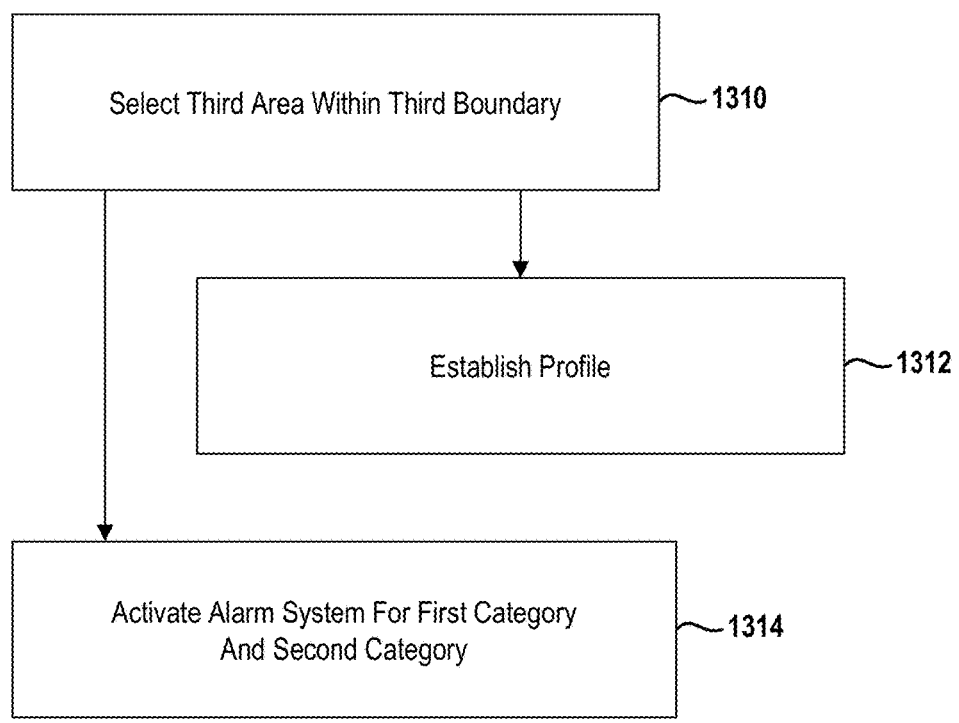
FIG. 13 is a flowchart of a method for establishing a profile or activating an alarm system.

Referring now to FIG. 13 other functions may also be performed. In this example, step 1310 selects the third display area within the third boundary 956 of FIG. 9B. As mentioned above, the selection of the third boundary may be used to establish a profile in step 1312. The profile may be used for establishing a parental control profile or an alarm system profile. Profiles may also be generated for various types of systems.

In step 1314 and alarm system may be activated by selecting the third area within the third boundary of FIG. 9A. For example, a third boundary may be formed by selecting various sensors and combining the display areas associated with the sensors into a third boundary. By tapping or performing some other type of gesture such as double tapping or sliding, the alarm system may be activated for those predetermined areas.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
defining a first display area on a screen display of a user device with a first boundary therearound;
displaying a first category indicator for a first category within the first boundary in screen display;
defining a second display area on the screen display with a second boundary therearound;
displaying a second category indicator for a second category within the second boundary on the screen display;
generating a first movement signal for moving the first display area relative to the second display area using a user interface;
when the first boundary and the second boundary touch or overlap on the screen display, defining a third boundary around a third display area, the third boundary comprises an area greater than the first display area and the second display area combined;
maintaining the first category indicator within the first boundary and the second category indicator within the second boundary so that the first boundary with the first category indicator therein and the second boundary with the second category indicator therein are displayed within the third display area defined by the third boundary;
selecting the third display area using the user interface;
performing a function corresponding to the first category and the second category in response to selecting, said function comprising enabling a first alarm sensor and a second alarm sensor or forming a video content list;
generating a second movement signal for moving the first display area away from the second display area using the user interface; and
when the first boundary and the second boundary are a predetermined distance apart, removing the third boundary.

2. The method of claim 1 wherein defining the second display area on the screen display comprises defining the second display area non-overlapping with the first display area.

3. The method of claim 1 wherein defining the first display area on the screen display with the first boundary comprises defining the first display area on a touch screen display with the first boundary.

4. The method of claim 1 wherein displaying the first category indicator comprises displaying a first graphical representation for the first category and wherein displaying the second category indicator comprises displaying a second graphical representation of the second category.

5. The method of claim 1 wherein generating movement signal comprises generating a movement signal in response to a screen gesture.

6. The method of claim 1 wherein generating the movement signal comprises generating a screen gesture within the first display area.

7. The method of claim 1 wherein generating the movement signal comprises generating the movement signal in response to a pointer.

8. The method of claim 1 wherein the first category comprises the first alarm sensor and the second category comprises the second alarm sensor.

9. A user device system comprising:
a screen display;
a user interface
a display control module defining a first display area on the screen display of with a first boundary therearound and displaying a first category indicator for a first category within the first boundary in screen display;
said display control module defining a second display area on the screen display with a second boundary therearound and displaying a second category indicator for a second category within the second boundary on the screen display;
a gesture control module receiving a movement signal from the user interface for moving the first display area relative to the second display area using a user interface;
said display control module defining a third boundary around a third display area representing the first category and the second category when the first boundary and the second boundary touch or overlap on the screen display and, displaying the first boundary with the first category indicator therein and the second boundary with the second category indicator therein within the third display area defined by the third boundary, the third boundary comprises an area greater than the first display area and the second display area combined;
said gesture module recognizing a selection signal from the user interface that selected the third display area; and
a controller performing a function in response to the selection signal, said function comprising enabling a first alarm sensor and a second alarm sensor or forming a video content list.

10. The system of claim 9 wherein the second display area and the first display area are non-overlapping.

11. The system of claim 9 wherein the user interface and the screen display are disposed in a touch screen display.

12. The system of claim 9 wherein the first category comprises a first graphical representation for the first category and wherein the second category indicator comprises displaying a second graphical representation of the second category.

13. The system of claim 9 wherein the movement signal comprises a screen gesture.

14. The system of claim 9 wherein the movement signal a screen gesture within the first display area.

15. The system of claim 14 wherein the first category comprises the first alarm sensor and the second category defines the second alarm sensor.

16. The system of claim 9 wherein the movement signal comprises a pointer signal.

17. A method of operating an alarm system comprising:
   defining a first display area on a screen display of a user device with a first boundary therearound;
   displaying a first alarm sensor indicator within the first boundary on the screen display;
   defining a second display area on the screen display with a second boundary therearound;
   displaying a second alarm sensor indicator within the second boundary on the screen display;
   generating a movement signal for moving the first display area relative to the second display area using a user interface;
   when the first boundary and the second boundary touch or overlap on the screen display, defining a third boundary around a third display area;
   displaying the first alarm sensor indicator within the first boundary and the second alarm sensor indicator within the second boundary so that the first boundary and the second boundary are displayed entirely within the third boundary;
   selecting the third display area using the user interface; and
   enabling the first alarm sensor and the second alarm sensor in response to selecting.

18. The method of claim 17 wherein defining the first display area on the screen display with the first boundary comprises defining the first display area on a touch screen display with the first boundary.

\* \* \* \* \*